3,251,876
PROCESS FOR AIR-OXIDATION OF BETA-ACYL-OXYALDEHYDES TO BETA-ACYLOXY-CARBOXYLIC ACIDS
Gerhard Robert Morlock, Grossauheim, near Hanau, Germany, assignor to E. I. du Pont de Nemours and Company, Wilmington, Del., a corporation of Delaware
No Drawing. Filed Jan. 25, 1963, Ser. No. 253,987
5 Claims. (Cl. 260—491)

This invention relates to a novel improved process for the preparation of carboxylic acids from sterically hindered aldehydes. More particularly, it relates to a novel improved process for the autoxidation of aldehydes which bear inert substituents on the α-carbon atom thereby converting the aldehydic starting materials to the corresponding carboxylic acids.

Many aldehydes undergo oxidation in contact with air. However, this autoxidation is too slow to be of preparative value, and frequently gives a complex mixture of products. Autoxidation of certain aldehydes is of preparative value when carried out in the presence of catalysts; in particular salts of manganese, iron, nickel or cobalt. U.S. Patent No. 2,294,984 describes the air-oxidation of n-butyraldehyde to n-butyric acid in the presence of a butyric acid solution of cobalt butyrate at temperatures above 40° C. The book, "The Chemistry of Isobutyraldehyde and Its Derivatives," by Hagemeyer and De Croes, published in 1953, discloses on page 20 that acetoxypivalaldehyde is converted to acetoxypivalic acid by air at 80° C. However, this procedure is of little commercial interest because of the low conversion realized. In U.S. Patent 2,820,055, it is reported that acetoxypivalic acid is obtained from the corresponding aldehyde at 60–65° C. in about 72% yield, using nitrogen dioxide as the oxidizing agent.

It is an object of this invention to provide a novel improved process for the autoxidation to carboxylic acids of aldehydes which bear substituents on the α-carbon atom (i.e., the carbon atom adjacent to the aldehydic carbonyl group) and which additionally bear an acyloxy group on the β-carbon atom.

Further objects will be apparent from the following specification and claims.

In accordance with these objects, there is provided an improved process for the autoxidation of β-acyloxy aldehydes having two inert substituents on the α-carbon atom, by agitating the aldehydic starting material with molecular oxygen while maintaining the mixture at a temperature within the range of from about 0° C. to about 30° C., preferably, about 20° C., and substantially atmospheric pressure, preferably in the presence of a solvent or diluent of a type to be described hereinafter. Intimate contact of the reaction mixture with oxygen is continued while cooling the reaction mixture to maintain the temperature within the indicated range. Generally a period of from about 0.5 hour to about 6 hours, preferably 2–3 hours, is required. Under such conditions substantially all of the aldehydic starting material is converted to the desired carboxylic acid, which may be isolated and purified in accordance with known procedures.

The aldehydic starting materials that may be oxidized in accordance with the process of this invention are those having the following formula

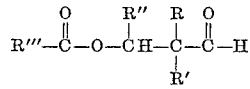

wherein R and R′, which may be the same, represent monovalent lower alkyl radicals containing from one to four carbon atoms each or may be joined together to form, together with the carbon atom to which they are attached, a cyclic structure containing five- or six-ring atoms; wherein R″ represents hydrogen or a monovalent lower alkyl radical containing no more than four carbon atoms; and wherein R‴ represents aliphatic and aromatic hydrocarbon radicals of from one to seven carbon atoms. Among suitable aldehydes may thus be named 2,2-dimethyl-3-formoxypropanal,
2,2-dimethyl-3-acetoxypropanal,
2,2-dimethyl-3-propionoxypropanal,
2,2-dimethyl-3-benzoyloxypropanal,
2,2-diethyl-3-formoxypropanal,
2,2-diethyl-3-acetoxypropanal,
2,2-diethyl-3-propionoxypropanal,
2,2-diethyl-3-benzoyloxypropanal,
2,2-dipropyl-3-formoxypropanal,
2,2-dipropyl-3-acetoxypropanal,
2,2-dipropyl-3-propionoxypropanal,
2,2-dipropyl-3-benzoyloxypropanal,
2,2-pentamethylene-3-formoxypropanal, also known as 1-formoxymethylcyclohexane-1-carboxaldehyde,
2,2-pentamethylene-3-acetoxypropanal,
2,2-pentamethylene-3-propionoxypropanal,
2,2-pentamethylene-3-benzoyloxypropanal, the corresponding 2,2-dimethyl-3-acyloxybutanals,
2,2-diethyl-3-acyloxybutanals,
2,2-dipropyl-3-acyloxybutanals,
2,2-pentamethylene-3-acyloxybutanals,
2,2-dimethyl-3-acyloxypentanals,
2,2-diethyl-3-acyloxypentanals,
2,2-dipropyl-3-acyloxypentanals,
2,2-pentamethylene-3-acyloxypentanals,
2,2-dimethyl-3-acyloxyhexanals,
2,2-diethyl-3-acyloxyhexanals,
2,2-dipropyl-3-acyloxyhexanals,
2,2-pentamethylene-3-acyloxyhexanals, and the like. Additionally those compositions containing two different substituents, of the character described, on the α-carbon atom may be employed; such aldehydes include the 2-methyl-2-ethyl-3-acyloxypropanals, 2-methyl-2-propyl-3-acyloxypropanals, 2-ethyl-2-propyl-3-acyloxypropanals, and the correspondingly substituted 2,2-dialkyl-3-acyloxybutanals, 2,2-dialkyl-3-acyloxypentanals, and 2,2-dialkyl-3-acyloxyhexanals. Certain substituted derivatives of the above-named aldehydes may also be utilized in the process of this invention. Suitable derivatives comprise those aldehydes wherein R and/or R′ represent alkyl radicals each bearing an inert substituent such as chlorine or alkoxy. Typical of the substituted aldehydes that may be used in the process of this invention is 2,2-bis(chloromethyl)-3-acetoxypropanal. Of these aldehydes, the preferred species are the 2,2-dimethyl-3-acyloxypropanals.

The desired acids produced in accordance with the present invention are of the formula

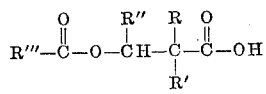

wherein R, R', R", and R''' have the meanings defined above. Illustrative of such acids are the compounds corresponding to the aldehydes named above wherein the aldehyde,

portion of the compound is replaced by an acid,

grouping.

The aldehydic starting materials may be prepared in accordance with known procedures. A suitable procedure is the aldol condensation of formaldehyde with an acetaldehyde bearing two substituents, in accord with the reaction:

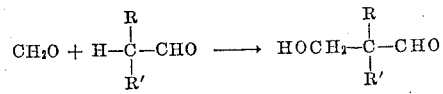

Esterification of the hydroxyl group of the β-hydroxyaldehydes may be effected by customary procedures, such as by reaction with a carboxylic acid in the presence of a mineral acid catalyst. By these reactions, a 2,2-dimethyl-3-acyloxypropanal (also known as acyloxypivalaldehyde) may be made from isobutyraldehyde. Other recognized procedures for the preparation of acyloxyaldehydes may also be satisfactorily employed. For optimum results in the oxidation step it is preferred that the acyloxyaldehydes be distilled shortly prior there to.

It is normally preferable that the process of this invention be carried out in the presence of an organic liquid medium. It is desirable for the organic medium chosen to serve as at least a partial solvent for both the organic reactants and the organic products of the reaction. Suitable solvents are stable to oxidation under the conditions of the reaction, and do not react with the acyloxyacid or have other adverse effect. These requirements preclude the use of media having olefinic double bonds or hydrogen atoms bonded to tertiary carbon atoms. Although the nature of the solvent is otherwise not critical, it is desirable that it have a boiling point at least 40° C. below that of the acyloxyaldehyde, and preferably below 150° C., to permit easy removal of the solvent from the product and any unchanged aldehyde, such as by evaporation or distillation. Among suitable solvents may be named acetic acid, benzene, chloroform and the like. Such solvents normally comprise from about 30% to about 90% by weight of the reaction mixture.

The process of this invention is normally carried out by contacting the aldehydic starting material, dissolved in an appropriate solvent, with gaseous oxygen or an oxygen containing gas (e.g., air), the partial pressure of the oxygen being within the range of from about 0.2–4 atmospheres. This contact may be made by bubbling the oxygen through the solvent medium while stirring the reaction mixture or by introducing the oxygen to a closed system containing the starting material and solvent, and effecting vigorous stirring, shaking, or the like to insure intimate contact of the gaseous phase with the liquid medium.

The oxidation is readily conducted while maintaining the reacting systems at a temperature within the range of from about 0° C. to about 30° C., for a period of from about 0.5 hour to about 6 hours, at substantially atmospheric pressure. The reaction period may be shortened by highly efficient mixing of the oxygen with the aldehyde, or by operating at elevated pressures, e.g., at an oxygen partial pressure of 50 p.s.i.g. Since the reaction is exothermic it is normally necessary to employ cooling means to maintain a temperature within the indicated range.

Isolation of the desired product may be effected by evaporating the solvent medium therefrom, or in some cases, by cooling to precipitate the acid in crystalline form. The acid may be purified by distillation in vacuum. This product is normally formed in yields which are substantially quantitative, i.e., in excess of about 90%. The course of the reaction may be followed by several methods. The acidic product may, for example, be determined by titration. Where closed systems are employed, it is preferable to supply substantially pure oxygen to the system as the reaction proceeds. It is then possible to measure the volume of oxygen which has been utilized, as, for example, by means of a gas burette or meter.

The acyloxyacids prepared by the process of this invention are useful chemical intermediates. They may be hydrolyzed to the hydroxyacids, which may be converted to fiber-forming polyesters, such as by the process of U.S. Patent 2,658,055.

The following examples will serve to illustrate the process of the present invention, but are not intended to limit it in any way. Numerous modifications will be apparent to those skilled in the art.

EXAMPLE I

To a solution of 51 g. (0.5 mole) of 2,2-dimethyl-3-hydroxypropanal (i.e., hydroxypivalaldehyde) in 200 ml. of benzene are added 120 g. (2 moles) of acetic acid and 1 g. of p-toluenesulfonic acid, and the mixture is heated to the temperature of reflux. Reflux is continued until no additional water is separated, as determined by means of a water trap at the base of the reflux condenser. The benzene and excess acetic acid are than removed by distillation. The desired product, 2,2-dimethyl-3-acetoxypropanal is distilled under reduced pressure, and isolated in about 90% yield.

EXAMPLE II

A solution containing 200 grams (1.39 moles) of acetoxypivalaldehyde (prepared as in Example I) in 200 milliliters (ml.) of benzene is placed in a 500 ml. 3-neck flask equipped with a thermometer, a stirrer, and a gas inlet tube provided with a fritted glass end. Oxygen is passed into the stirred solution at the rate of 200–300 ml./min. The inside temperature is maintained at about 25° C. by the application of external cooling. The reaction is permitted to proceed under these conditions until the temperature of the reaction mixture remains constant without the use of the external cooling bath; this requires about 3 hours. Oxygen is then passed in for an additional 3 hours without external cooling of the flask.

The solvent is removed by distillation, and the residual material is distilled in vacuo. After a forerun of about 30 g. (15%) of unchanged aldehyde, the desired acetoxypivalic acid is obtained in the amount of 180 g. (81% conversion) at a boiling range between 135° C. and 145° C. under an absolute pressure of 15 mm. of mercury. Thus, about 96% of the starting aldehyde is converted to the desired acid, or is recovered unchanged. The melting point of the acid, following recrystallization from hexane, is found to be within the range from 58–60° C. Elemental analyses agree closely with the values calculated for acetoxypivalic acid.

EXAMPLE III

This example describes the preparation of acetoxypivalic acid from isobutyraldehyde without isolation of the intermediates.

The preparation of hydroxypivalaldehyde is effected by the procedure of Stiller et al., J. Am. Chem. Soc., 62, p. 1787 (1940), starting with 100 g. (1.39 moles) of isobutyraldehye, 120 g. of 37% formaldehyde (representing 1.48 moles of the aldehyde), and 40 g. of potassium carbonate. The hydroxyaldehyde thereby prepared is removed from the reaction mixture by extraction with 200 ml. of benzene. Acetylation of the hydroxyaldehyde is carried out, after the benzene solution is dried over sodium sulfate, by adding the benzene solution over a period of 3 hours to a refluxing mixture containing 330 g. of acetic acid, 100 ml. of benzene, and 3 g. of p-toluenesulfonic acid, and then allowing this mixture to reflux until no more water is separated in the trap at the base of the reflux condenser. Without further purification or treatment, the solution is subjected to oxidation as described in the preceding example by passing oxygen through the mixture with stirring at a temperature of 25°. Following removal of the solvent and excess acetic acid, the desired acetoxypivalic acid is distilled under reduced pressure. It is isolated in 67% yield, based upon the isobutyraldehyde initially charged.

EXAMPLE IV

A series of experiments is carried out to ascertain the effect of temperature and other reaction conditions upon the autoxidation of acetoxypivalaldehyde. Each experiment is carried out with 30 g. (0.208 mole) of freshly distilled aldehyde contained in a 200-ml. glass flask fitted with a gas-tight stirrer and a neck attached to a gas burette containing oxygen gas at about atmospheric pressure. The flask is immersed in a water bath to control the temperature inside the flask. In some experiments, the flask also contains 30 ml. of a solvent. After the desired contents are placed in the flask, it is flushed quickly with oxygen, connected to the gas burette, and stirred at a constant rate. The amount of oxygen absorbed is measured at periodic intervals by noting the change in volume of gas in the burette. The theoretical oxygen uptake required to completely convert 30 g. of the aldehyde to acetoxypivalic acid is 2330 ml. (0.104 mole), as measured at 0° C. and 1 atmosphere. The volume of oxygen that is consumed by the reaction after 1, 2, and 3 hours at various water bath temperatures is shown in the following tables:

*Table I*

OXIDATIONS WITHOUT A SOLVENT

| Temperature (° C.) | Volume of Oxygen Consumed (ml.) | |
|---|---|---|
| | 1 hr. | 2 hrs. |
| 60 | 630 | 680 |
| 28 | 1,290 | 1,750 |

*Table II*

OXIDATIONS IN ACETIC ACID

| Temperature (° C.) | Volume of Oxygen Consumed (ml.) | | |
|---|---|---|---|
| | 1 hr. | 2 hrs. | 3 hrs. |
| 60 | 800 | 840 | |
| 26 | 1,190 | 1,360 | 1,400 |
| 0 | 1,060 | 1,720 | 2,040 |
| 0 | 1,030 | 1,710 | 2,030 |
| 0 | 1,020 | 1,690 | 2,020 |

*Table III*

OXIDATIONS IN OTHER SOLVENTS

| Solvent | Temperature (° C.) | Volume of Oxygen Consumed (ml.) | | |
|---|---|---|---|---|
| | | 1 hr. | 2 hrs. | 3 hrs. |
| 30 ml. benzene | 25 | 2,040 | 2,260 | 2,290 |
| 30 ml. benzene and 30 ml. acetic acid | 25 | 2,120 | 2,300 | |
| 30 ml. chloroform | 25 | 1,650 | 2,060 | 2,190 |

The above experiments indicate that the oxidation to the desired acid is actually more complete in 2–3 hours at or below 28° than at 60°. This is very surprising because it is commonly known that the rate of chemical reactions increases as the temperature of the reactions is increased. From the experiments shown in Tables II and III the acetoxypivalic acid is isolated in about 90% conversion by evaporating off the solvents. It is preferred to operate the present process in the substantial absence of materials taught in the art as being useful catalysts for the autoxidation of other types of organic substances. These generally serve no useful purpose in the instant reaction, and in many instances actually have a deleterious effect.

EXAMPLE V

Another series of experiments, carried out in acetic acid, illustrates the effect of temperature, and provides a measure of the extent of by-product formation. The formation of by-products is indicated by the generation of carbon monoxide and carbon dioxide when the reaction product mixture is heated to 60–100° C. The experiments are each carried out with a homogeneous mixture of 14.4 g. (0.10 mole) of fresh acetoxypivalaldehyde and 20.0 g. acetic acid in a 100-ml. flask having 2 necks, one connected to a 2000 ml. gas burette, and the other neck bearing a thermometer to measure the temperature of the flask contents. The temperature inside the flask is controlled to within 1° of the desired oxidation temperature by intermittently immersing the flask in a bath of cold or warm water, as appropriate to the desired reaction temperature. The flask is mounted on a wrist-action shaking apparatus to provide good mixing of the liquid reaction mixture with the oxygen atmosphere in the flask. The flask contents are kept under nitrogen until the desired temperature is attained and the reaction is ready to begin. The flask is then quickly flushed with oxygen, sealed to the oxygen supply, and agitation started. The oxygen absorption is allowed to proceed until it substantially ceases.

To decompose the by-products, such as peroxides, and thereby generate the carbon oxides, the flask (still connected to the gas burette) is heated overnight at 80–100° C. The next morning, the still-hot liquid contents are purged with a measured volume of nitrogen to sweep out any dissolved gaseous oxides. The temperature of the liquid is then changed to that used during oxidation, and the final volume of gases is determined. The gaseous mixture is then analyzed to determine its content of oxygen, carbon monoxide, and carbon dioxide, the latter two being a measure of the amount of by-product formed. The experimental results are shown in the following table:

*Table IV*

OXIDATION OF 0.1 MOLE ACETOXYPIVALALDEHYDE IN 20 G. ACETIC ACID AT VARIOUS TEMPERATURES

| Temperature (° C.) | Time (min.) | Oxygen Consumption | | Moles $CO+CO_2$ Formed |
|---|---|---|---|---|
| | | Volume (ml.) | Moles | |
| 10 | 260 | 1,214 | .0542 | .0045 |
| 20 | 200 | 1,277 | .0570 | .0053 |
| 30 | 160 | 1,278 | .0570 | .0076 |

The above table indicates that the amount of carbon monoxide and carbon dioxide formed increases as oxidation temperatures increase. As will be shown below, temperatures of about 80° C. will direct the oxidation almost entirely away from the production of acetoxypivalic acid. However, it is seen from the table that as the temperature decreases, the rate of reaction decreases. In accordance with the present invention however, not only does the reaction proceed rapidly but also the production of undesired by-products is almost eliminated.

For example, in the experiment at 10°, the amount of oxygen consumed beyond the .0500 mole theoretically required to convert all the acetoxypivalaldehyde to acetoxypivalic acid is .0042 mole, which is close to the .0045 mole of by-product gases formed. If it is assumed that 1 mole of either carbon monoxide or carbon dioxide represents 1 mole of aldehyde converted to products other than acetoxypivalic acid, and that the balance of the aldehyde is converted only to the acetoxy acid, then the experiment at 10° gives a 95.5% yield of that acid, and that at 20° gives a 94.7% yield. A correlation between this theoretical yield and the quantity of acid that may actually be isolated from a reaction carried out in the same fashion is provided in Example VI.

EXAMPLE VI

A mixture of 144 g. (1.00 mole) acetoxypivalaldehyde and 200 g. acetic acid is maintained at 20° C. while being oxidized in accord with the procedure of Example V. Oxygen consumption ceases after 3 hours. The mixture is heated overnight at 90–100° and then distilled, initially at 1 atmosphere to remove acetic acid, and then in a vacuum. The following fractions distill over at 20 mm.:

9.1 g. at 70–140° C., most at 80–82°
141.7 g. at 140–147° C., most at 145–147°

The second fraction melts at 54–56° and represents an 89% yield of acetoxypivalic acid.

By extrapolation of the results shown in Table IV, one would expect that useful quantities of acetoxypivalic acid would be obtained by oxidation of acetoxypivalaldehyde at 80° C. It is accordingly very surprising to observe that this is not the case, as shown by the following experiments.

EXAMPLE VII

Freshly distilled acetoxypivalaldehyde (14.4 g., 0.1 mole) is dissolved in 100 ml. glacial acetic acid contained in a 250-ml. 3-neck flask equipped with a thermometer, reflux condenser, and a gas inlet tube having a fritted glass outlet below the surface of the solution. Stirring is provided by means of a polytetrafluoroethylene-covered magnetic bar. The temperature of the stirred solution is maintained at 26–27° C. while air is bubbled therethrough at a rate of 35 ml. per minute for a period of 22 hours. The acetic acid is then evaporated from the resulting mixture under reduced pressure, at a temperature not exceeding 35° C. The residue is then dissolved in diethyl ether; the acidic products are extracted from this solution with small portions of an aqueous solution of potassium bicarbonate. The extraction is repeated until the aqueous solution remains slightly alkaline following thorough intermixing with the ether solution. The acidic material is regenerated by acidifying the composited aqueous extracts to pH 3 with dilute sulfuric acid, followed by two extractions with diethyl ether, drying, and removal of the ether by evaporation. The residual solid (7.78 g., 48.3% conversion) is identified as acetoxypivalic acid by comparison of its infrared spectrum with that of an authentic sample.

The above experiment is duplicated, with the exception that the acetoxypivalaldehyde/acetic acid solution is held at 80–82° C. during the 22 hours oxidation period. Only 0.32 g. (2% conversion) of acetoxypivalic acid is obtained.

EXAMPLE VIII

A solution of 10.0 g. (.069 mole) acetoxypivalaldehyde in 100 ml. benzene (boiling point 80° C.) is boiled for 6 hours under reflux while air is passed through the solution. Removal of the benzene by evaporation under reduced pressure leaves an oil that does not crystallize. Distillation of this oil at 0.1 mm. provides 5.5 g. of unchanged acetoxypivalaldehyde, which passes over at 50–60° C. Acetoxypivalic acid is not observed.

EXAMPLE IX

Formoxypivalaldehyde is prepared from crude hydroxypivalaldehyde (68.5% pure), containing benzene and unchanged isobutyraldehyde, the hydroxyaldehyde being obtained by the procedure set forth in Example III.

A mixture of 400 g. of the crude hydroxypivalaldehyde, 200 g. formic acid (98–100% pure), 3 g. p-toluenesulfonic acid, and 200 ml. benzene is placed in a 1000-ml. 3-neck flask fitted with a thermometer, dropping funnel, and a short column surmounted by a distillation head attached to a condenser and water-separator. The upper benzene layer in the separator is returned to the flask by continuous overflow. The lower aqueous formic acid layer is removed periodically. Additional formic acid (200 ml.) is added to the flask to compensate for that removed from the separator. After the water-formation ceases, the reaction mixture is fractionally distilled; the last fraction (boiling point about 74° C. at 20 mm.) comprises 240 g. of formoxypivalaldehyde. This quantity represents a 69% conversion, based upon the initial hydroxyaldehyde.

Oxidation of 13.0 g. formoxypivalaldehyde dissolved in 20 ml. benzene is carried out at 20° C. in a 100 ml. flask according to the procedure of Example V. The oxygen absorption is complete in 465 min., a total of 1142 ml. (.051 mole, or 102% of theory) is absorbed. The total volume of carbon monoxide and carbon dioxide formed is 22 ml. (.001 mole), which indicates that a very high yield of formoxypivalic acid is formed.

Although the above examples illustrate the practice of the process of this invention in batch operation, it will be apparent to those skilled in the art that the autoxidation may also suitably be carried out as a continuous process. For example, a solution of acyloxyaldehyde may be passed downwardly through a gas-washing tower containing a porous solid packing, countercurrently to a stream of air or other oxygen-containing gas. Cooling means may be provided in the tower. The liquid effluent from the bottom of the tower is then rectified to isolate the acyloxy acid. Unchanged aldehyde and solvent recovered thereby may then be mixed with additional aldehyde and recycled through the tower. In another method, oxygen-containing gas is bubbled through a liquid solution of the acyloxyaldehyde, a portion of the solution being continuously drawn off, and an equal volume of aldehyde solution being continuously added. The liquid effluent is rectified to isolate the product, the unchanged aldehyde and solvent being returned to the reactor along with additional aldehyde.

What is claimed is:

1. A process for preparing an acid from an aldehyde of the formula:

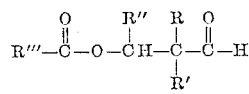

wherein R and R', which may be the same, represent alkyl radicals of from one to four carbon atoms and joined together form a cyclic structure of from five to six ring atoms; R'' is selected from the group consisting of hydrogen and alkyl radicals of from one to four carbon atoms and R''' represents a member of the group consisting of aliphatic and aromatic hydrocarbon radicals of up to seven carbon atoms, which comprises agitating the said aldehyde with molecular oxygen while cooling the reaction mixture to maintain the same at a temperature within the range of from about 0° C. to about 30° C.

2. The process of claim 1 wherein the reaction takes place in the presence of an inert organic liquid medium having a boiling point at least 40° C. below that of the acyloxyaldehyde and below 150° C.

3. The process of claim 2 wherein the reaction temperature is maintained at about 20° C.

4. A process for preparing acetoxypivalic acid comprising agitating acetoxypivalaldehyde with molecular oxygen while cooling the reaction mixture to maintain the same at a temperature within the range of from about 0° C. to about 30° C.

5. The process of claim 4 wherein the acetoxypivalaldehyde is dissolved in an inert organic liquid medium.

References Cited by the Examiner

Conant, J.A.C.S., 51, pp. 1246–1251 (1929).
Hagemeyer, "The Chemistry of Isobutyraldehyde and Its Derivatives," p. 20 (1953).

LORRAINE A. WEINBERGER, *Primary Examiner.*

LEON ZITVER, *Examiner.*